US011667246B1

(12) United States Patent
Baca (10) Patent No.: US 11,667,246 B1
(45) Date of Patent: Jun. 6, 2023

(54) ROOF-MOUNTED CARGO HOLD

(71) Applicant: Thomas D. Baca, Durango, CO (US)

(72) Inventor: Thomas D. Baca, Durango, CO (US)

(*) Notice: Subject to any disclaimer, the term of this patent is extended or adjusted under 35 U.S.C. 154(b) by 82 days.

(21) Appl. No.: 17/508,072

(22) Filed: Oct. 22, 2021

(51) Int. Cl.
    *B60R 9/055* (2006.01)
    *A47K 3/28* (2006.01)
    *B60R 15/02* (2006.01)

(52) U.S. Cl.
    CPC ............ *B60R 9/055* (2013.01); *A47K 3/285* (2013.01); *B60R 15/02* (2013.01)

(58) Field of Classification Search
    CPC ......... B60R 9/055; B60R 15/02; A47K 3/285; A47K 3/286
    USPC .............................................. 4/596, 615–617
    See application file for complete search history.

(56) References Cited

U.S. PATENT DOCUMENTS

| | | | |
|---|---|---|---|
| 3,265,262 | A | 8/1966 | Motsinger |
| 3,696,979 | A | 10/1972 | Erickson |
| 4,364,133 | A | 12/1982 | Gunter |
| 4,457,553 | A | 7/1984 | Larkin |
| 6,295,663 | B1 | 10/2001 | Haller et al. |
| 8,225,436 | B1 | 7/2012 | Cotton |
| 9,629,508 | B2 | 4/2017 | Cotton |
| 2005/0217018 | A1* | 10/2005 | Ebbe ........................ B60P 3/22 4/616 |

FOREIGN PATENT DOCUMENTS

JP     H0840151 A * 2/1996 ............. B60R 9/055

OTHER PUBLICATIONS

Road Shower 4S. Product Listing [online] © 1996-2021, Amazon. com, Inc. [retrieved on Jul. 15, 2019]. Retrieved from the Internet: <URL: https://www.amazon.com/Road-Shower-4S/dp/BOOKMAXIEI>.

* cited by examiner

Primary Examiner — Tuan N Nguyen
(74) Attorney, Agent, or Firm — Cramer Patent & Design, PLLC; Aaron R. Cramer (57) ABSTRACT

The aluminum structured travel cargo hold may comprise a water tank, a shower, a rooftop carrier, and a plurality of reflectors. The aluminum structured travel cargo hold may be a cartop cargo hold that may be mounted to rooftop cargo rails of a vehicle. The aluminum structured travel cargo hold may be equipped for recreational use. As non-limiting examples, the recreational use may comprise camping and tailgating. The water tank may be a source of water. The rooftop carrier may carry personal belongings and may house the water tank, the shower, and the plurality of reflectors. The shower may be adapted to provide the water for showering. The plurality of reflectors may be increase visibility of the rooftop carrier while traveling.

20 Claims, 9 Drawing Sheets

ROOF-MOUNTED CARGO HOLD

RELATED APPLICATIONS

None.

FIELD OF THE INVENTION

The present invention relates generally to a cargo hold and more specifically to a roof-mounted cargo hold.

BACKGROUND OF THE INVENTION

With sales at an all-time high, the popularity of the sport-utility-vehicle, mini-vans, and associated cross over vehicles, as an everyday vehicle is wider spread than it ever has been. Many of these vehicles are used for camping or other off-road excursions away from the luxuries of life such as running hot and cold water and electricity. Also, most of these vehicles are capable of being equipped with luggage racks to hold a roof top cargo carrier.

While these carriers increase the cargo carrying ability of such vehicles, they do nothing to enhance the off-road experience forcing owners to bring containers of water, portable battery packs, generators, auxiliary lights, portable showers, and other devices which ironically eat up the cargo space that the rooftop carrier was attempting to preserve. Accordingly, there exists a need for a means by which rooftop cargo carriers can do more than simply carry cargo. The development of the Roof-Mounted Cargo Hold fulfills this need.

SUMMARY OF THE INVENTION

To achieve the above and other objectives, the present invention provides for An aluminum structured travel cargo hold which has, a water tank which has a water source and a tank aperture which has a corresponding cap, a shower which has a pump, a water filter, a shower hose, and a shower head, a rooftop carrier which has a shell and a support frame, a plurality of reflectors dispersed over the rooftop carrier to reflect light from the rooftop carrier, the reflectors increasing visibility of the rooftop carrier while traveling, and a power switch energizing and de-energizing the pump.

The shower is adapted to provide a plurality of water from the water source for showering. The pump includes an intake and an output. The shower is adapted to spray the water on a user for personal hygiene. The shower head is coupled to a distal end of the shower hose and a proximal end of the shower hose is coupled to an outlet of the water filter. The water filter removes one or more impurities from the water as the water flows through the water filter. The rooftop carrier containing the water tank that is also mounted within the rooftop carrier. The support frame provides internal rigidity and a distinctive appearance for the rooftop carrier. The shell protects a plurality of contents of the rooftop carrier from weather The water may be removed from the water tank via an internal tubing that enters the water tank through the tank aperture. The internal tubing may couple the output of the pump to the inlet of the water filter. The water tank may have a capacity of two gallons. The water may enter the water filter at the inlet of the water filter and may flow through the water filter to the outlet. The water tank, the pump, and the water filter may be fluidly coupled to each other via the internal tubing. The pump may draw the water from the water tank through the internal tubing into the intake of the pump and expel the water via the output of the pump. The pump may move the water by applying rotary motion, reciprocating motion, linear motion, or a combination thereof to one or more gears, one or more screws, one or more pistons, one or more shuttle blocks, one or more vanes, one or more diaphragms, one or more plungers, one or more chains, one or more ropes, one or more impellers, or any combinations thereof. The shower head may be a plumbing fixture that converts a flow of pressurized water into a spray which exits the shower head via a plurality of apertures on the shower head. The shower hose may be coiled and stored within the rooftop carrier when not in use. The shower hose and the shower head may be pulled from the rooftop carrier via an access panel prior to use. The shower hose may exit the rooftop carrier via an aperture disposed on the rooftop carrier. The rooftop carrier may be coupled to a pair of rooftop cargo rails via a plurality of mounting hardware. The shell may include a left side panel, a right side panel, a front panel, a rear panel, the access panel, an interior bottom panel, a left front corner cover, a right front corner cover, a left rear corner cover, and a right rear corner cover. The corners of the shell may be rounded, and the rear of the shell may be lower than the front of the shell.

The power switch may be mounted within the rooftop carrier and may be supplied with an electrical potential from a vehicle's electrical system. The power switch may pass the electrical potential to the pump when the power switch is in an ON state and the power switch may block the electrical potential from reaching the pump when the power switch is in an OFF state. The pump may be an electromechanical pump that may include an integral motor that is energized by an electrical potential to the pump. The shell may be aerodynamically shaped to increase fuel efficiency of a vehicle carrying the rooftop carrier. A remote control FOB may vary the power switch between the ON state and the OFF state by transmitting a wireless signal to the power switch.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 100 aluminum structured travel cargo hold
200 rooftop carrier
206 overhead arching cross member
208 lateral intermediate cross member
210 shell
212 left side panel
214 right side panel
216 front panel
218 rear panel
220 access panel
222 access aperture
224 latch
226 hinge
228 interior bottom panel
230 left front corner cover
232 right front corner cover
234 left rear corner cover
236 right rear corner cover
240 individual corner cover
242 parallel cut
244 rib
246 backbone
248 corner fastener
260 support frame
262 left lower rail
264 right lower rail
266 left upper rail
268 right upper rail
270 left front upright
272 right front upright
274 left rear upright
276 right rear upright
278 top front cross brace
280 bottom front cross brace
282 top rear cross brace
284 bottom rear cross brace
300 water tank
312 power switch
314 remote control fob
316 wireless signal
318 shower hose
324 shower head
330 pump
332 water filter
340 aperture
390 plurality of reflectors

DESCRIPTION OF THE PREFERRED EMBODIMENTS

The best mode for carrying out the invention is presented in terms of its preferred embodiment, herein depicted within FIGS. 1 through 13. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

The aluminum structured travel cargo hold 100 (hereinafter invention) may comprise a water tank 300, a shower, a rooftop carrier 200, and a plurality of reflectors 390. The invention 100 may be a cartop cargo hold that may be mounted to rooftop cargo rails of a vehicle. The invention 100 may be equipped for recreational use. As non-limiting examples, the recreational use may comprise camping and tailgating. The water tank 300 may be a source of water. The rooftop carrier 200 may carry personal belongings and may house the water tank 300, the shower, and the plurality of reflectors 390. The shower may be adapted to provide the water for showering. The plurality of reflectors 390 may be increase visibility of the rooftop carrier 200 while traveling.

The water tank 300 may be mounted within the rooftop carrier 200. The water tank 300 may be filled via a tank aperture after removing a cap. The water may be removed from the water tank 300 via internal tubing that enters the water tank 300 through the aperture. The capacity of the water tank 300 may vary based upon the specifications of the rooftop cargo rails for the vehicle. A capacity of at last two gallons (2 Gal.) may be typical.

The shower may comprise a pump 330, a water filter 332, a shower hose 318, and a shower head 324. The shower may be adapted to spray the water on a user for personal hygiene. The water for the shower may be pumped from the water tank 300. The water tank 300, the pump 330, and the water filter 332 may be fluidly coupled to each other via the internal tubing.

The pump 330 may draw the water from the water tank 300 through the internal tubing into the intake of the pump 330 and may expel the water via the output of the pump 330. The pump 330 may be electromechanical in nature and may comprise an integral motor that may be energized by the application of an electrical potential to the pump 330. As non-limiting examples, the pump 330 may move the water by applying rotary motion, reciprocating motion, linear motion, or a combination thereof to one (1) or more gears, screws, pistons, shuttle blocks, vanes, diaphragms, plungers, chains, ropes, impellers, or combinations thereof.

The internal tubing may couple the output of the pump 330 to the inlet of the water filter 332. The water may enter the water filter 332 at the inlet of the water filter 332 and flow through the water filter 332 to the outlet. The water filter 332 may remove one (1) or more impurities from the water as the water flows through the water filter 332.

Figure 12:
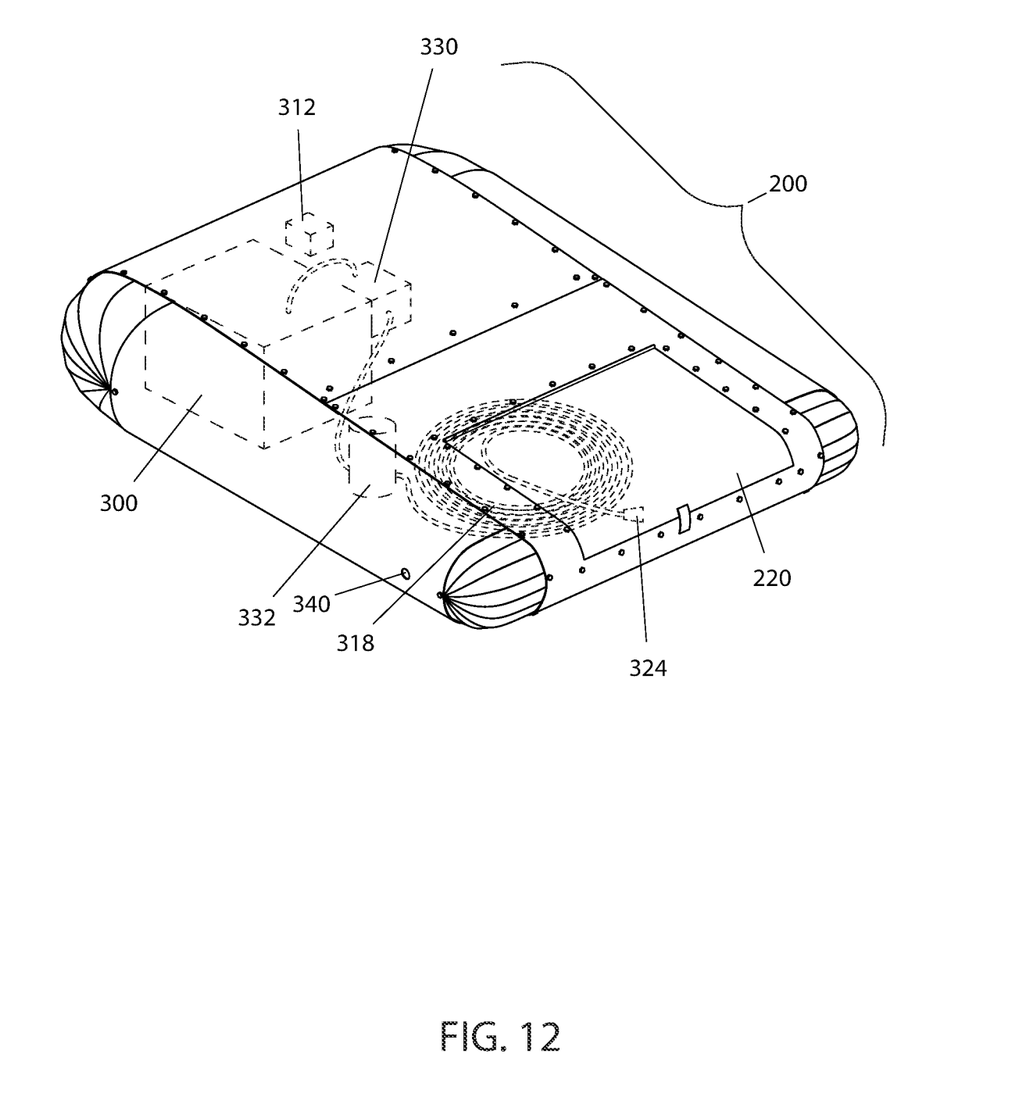
FIG. 12 is a detail view of the aluminum structured travel cargo hold illustrating elements of the shower with the access panel closed, according to the preferred embodiment of the present invention.
Figure 13:
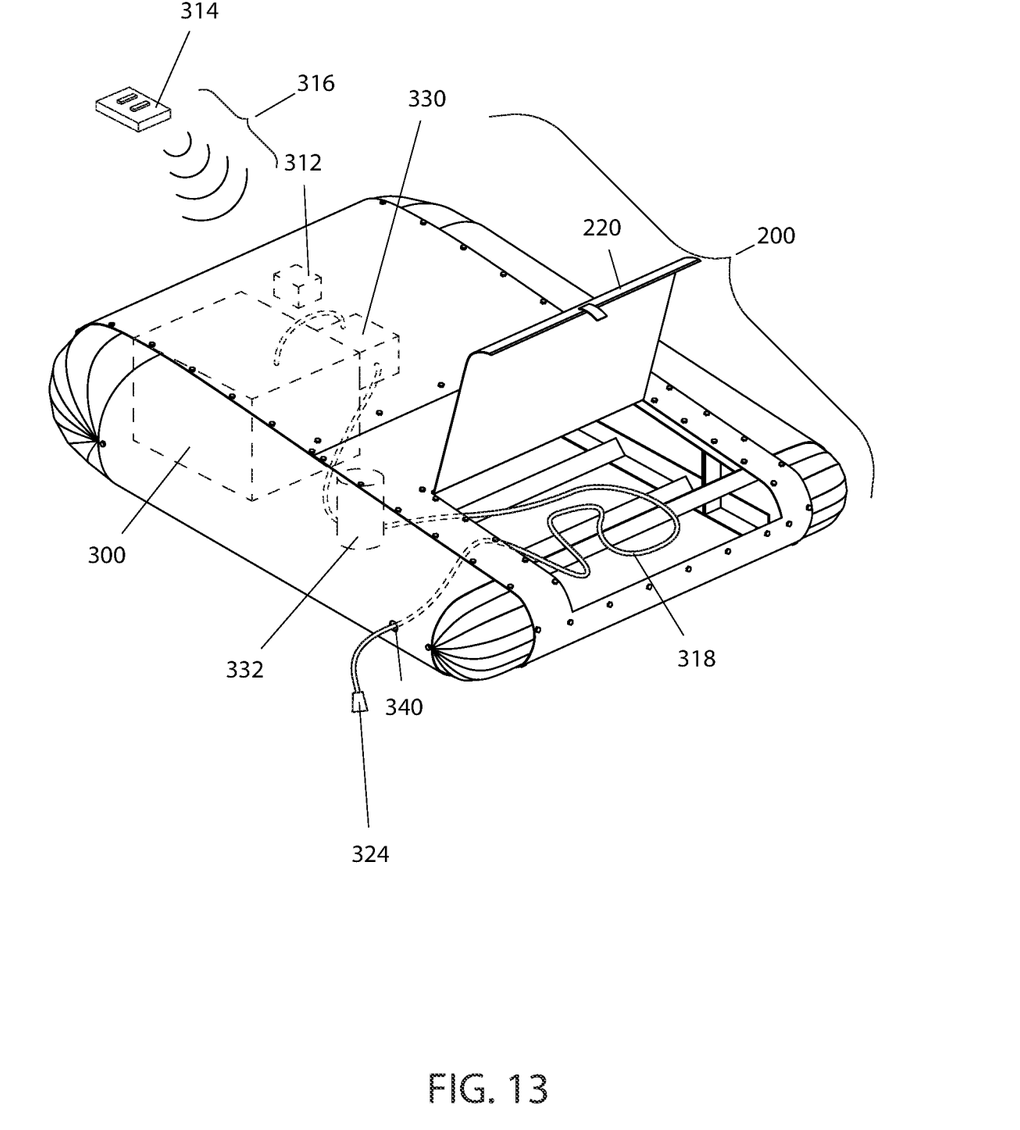
FIG. 13 is a detail view of the aluminum structured travel cargo hold illustrating elements of the shower with the access panel open, according to the preferred embodiment of the present invention.

The shower head 324 may be a plumbing fixture that converts a flow of pressurized water into a spray which exits the shower head 324 via a plurality of apertures on the shower head 324. The shower head 324 may be coupled to the distal end of the shower hose 318. The proximal end of the shower hose 318 may be coupled to outlet of the water filter 332. In some embodiments, the shower hose 318 may be coiled and stored within the rooftop carrier 200 when not in use as shown in FIG. 12. The shower hose 318 and the shower head 324 may be pulled from the rooftop carrier 200 via an access panel 220 prior to use. In some embodiments, the shower hose 318 may exit the rooftop carrier 200 via an aperture 340.

The pump 330 may be energized and de-energized by a power switch 312. The power switch 312 may be mounted within the rooftop carrier 200 and may be supplied with the electrical potential from the vehicle's electrical system. The power switch 312 may pass the electrical potential to the pump 330 when the power switch 312 is in an ON state. The power switch 312 may block the electrical potential from reaching the pump 330 when the power switch 312 is in an OFF state. The ON/OFF state of the pump 330 may be controlled by a remote control fob 314. The remote control fob 314 may vary the power switch 312 between the ON state and the OFF state by transmitting a wireless signal 316 to the power switch 312.

The rooftop carrier 200 may comprise a shell 210 and a support frame 260. The support frame 260 may provide internal rigidity for the rooftop carrier 200. The shell 210 may provide a distinctive appearance for the rooftop carrier 200. The rooftop carrier 200 may be coupled to the rooftop cargo rails via mounting hardware.

The shell 210 may protect contents of the rooftop carrier 200 from weather. The shell 210 may be aerodynamically shaped to increase fuel efficiency of the vehicle carrying the rooftop carrier 200.

The shell 210 may comprise a left side panel 212, a right side panel 214, a front panel 216, a rear panel 218, the access panel 220, an interior bottom panel 228, a left front corner cover 230, a right front corner cover 232, a left rear corner cover 234, and a right rear corner cover 236. As non-limiting examples, corners of the shell 210 may be rounded and the rear of the shell 210 may be lower than the front of the shell 210.

The left side panel 212 may be a rectangular, semi-rigid panel bent into an arch. The bottom of the left side panel 212 may be coupled to a left lower rail 262. The top of the left side panel 212 may be coupled to the front panel 216 and to the rear panel 218. The right side panel 214 may be a rectangular, semi-rigid panel bent into an arch. The bottom of the right side panel 214 may be coupled to a right lower rail 264. The top of the right side panel 214 may be coupled to the front panel 216 and to the rear panel 218.

The front panel 216 may be a rectangular, semi-rigid panel bent into an arch. The bottom of the front panel 216 may be coupled to a bottom front cross brace 280. The rear panel 218 may be a rectangular, semi-rigid panel bent into an arch. The bottom of the rear panel 218 may be coupled to a bottom rear cross brace 284. The rear panel 218 and the front panel 216 may overlap and may be coupled to each other. The rear panel 218 may comprise an access aperture 222 which may be an opening that provides access to the interior of the rooftop carrier 200. The access aperture 222 may be covered by the access panel 220. The access panel 220 may be coupled to the rear panel 218 via a hinge 226 and may pivot between an open position and a closed position. A latch 224 may be operable to retain the access panel 220 in the closed position.

The left front corner cover 230, the right front corner cover 232, the left rear corner cover 234 and the right rear corner cover 236 may be placed at the corners of the shell 210 to complete the enclosure. The left front corner cover 230 may couple to the front panel 216 and the left side panel 212. The right front corner cover 232 may couple to the front panel 216 and the right side panel 214. The left rear corner cover 234 may couple to the rear panel 218 and the left side panel 212. The right rear corner cover 236 may couple to the rear panel 218 and the right side panel 214.

Figure 8:
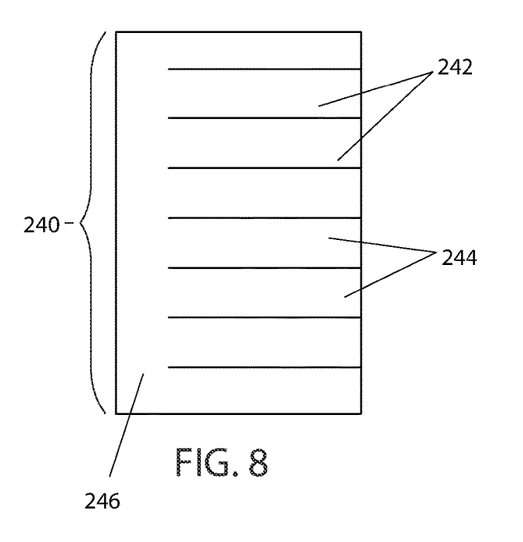
FIG. 8 is a top plan view of an individual corner cover in a flat configuration, according to the preferred embodiment of the present invention.
Figure 9:
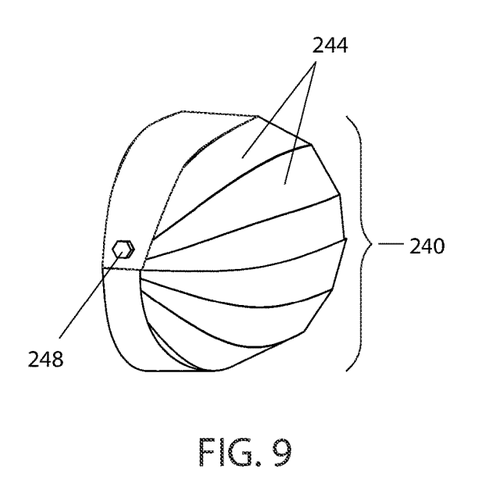
FIG. 9 is a top plan view of an individual corner cover in a rolled configuration, according to the preferred embodiment of the present invention.
Figure 10:
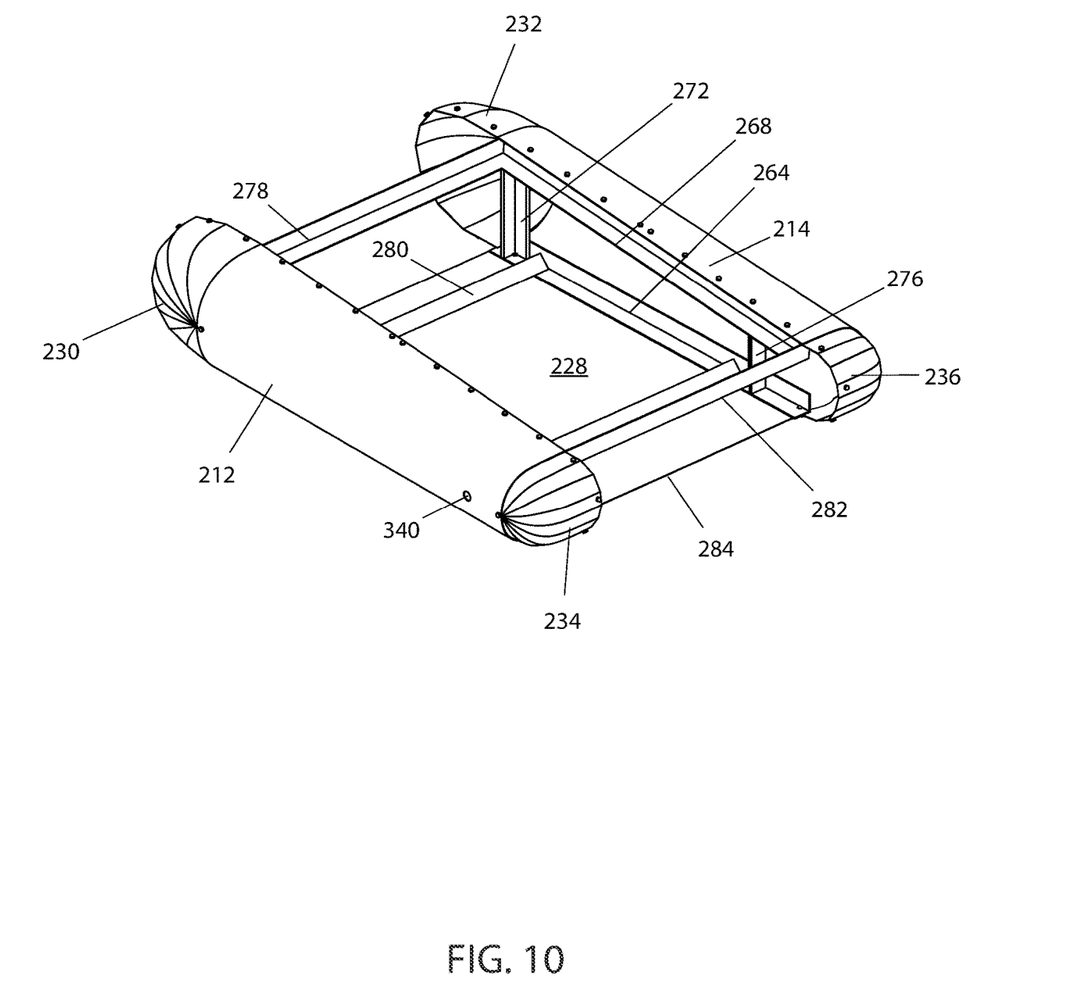
FIG. 10 is a top rear right perspective view of the aluminum structured travel cargo hold with the shell and rear panel removed, according to the preferred embodiment of the present invention.

An individual corner cover 240 selected from the left front corner cover 230, the right front corner cover 232, the left rear corner cover 234 and the right rear corner cover 236 may be formed from a rectangular sheet comprising a plurality of parallel cuts 242. The plurality of parallel cuts 242 may define a plurality of ribs 244 connected to a backbone 246. To complete the individual corner cover 240, the backbone 246 may be arched while simultaneously bending and overlapping the ends of the plurality of ribs 244. The individual corner cover 240 may retain shape when one (1) or more corner fasteners 248 are coupled to the plurality of ribs 244.

Figure 1:
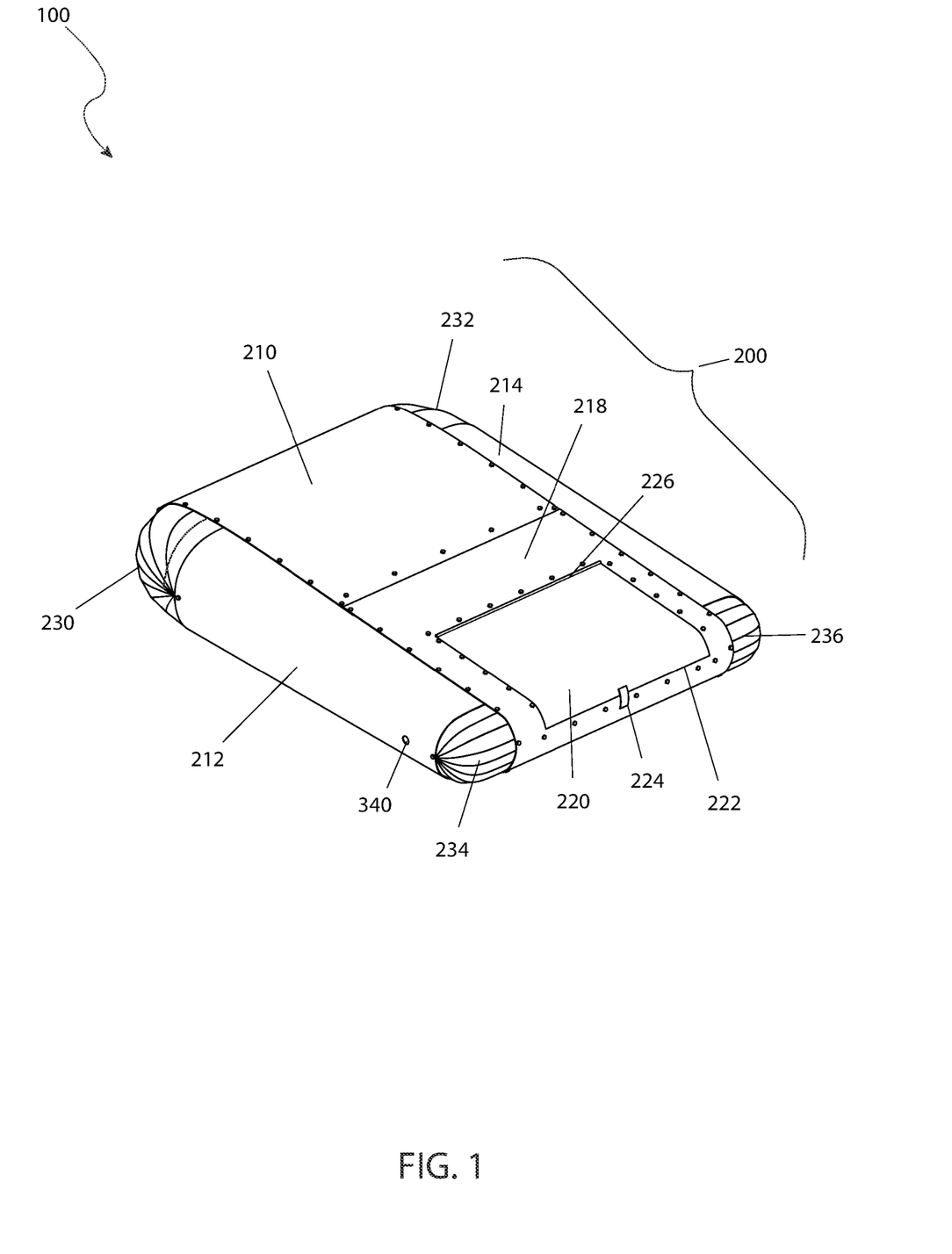
FIG. 1 is a top rear right perspective view of an aluminum structured travel cargo hold, according to the preferred embodiment of the present invention.
Figure 2:
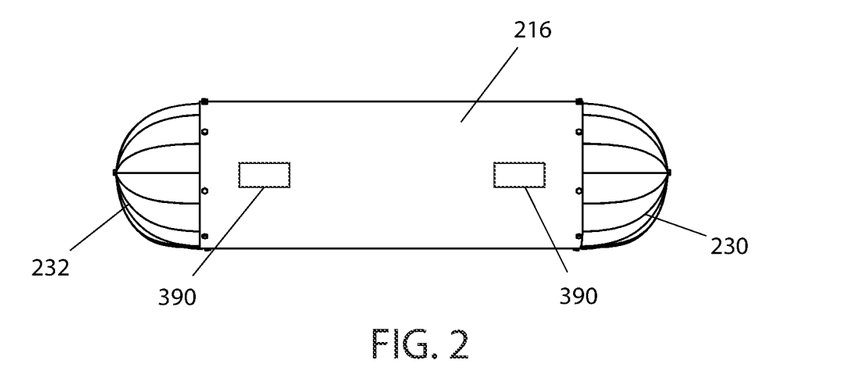
FIG. 2 is a front elevation view of the aluminum structured travel cargo hold, according to the preferred embodiment of the present invention.
Figure 3:
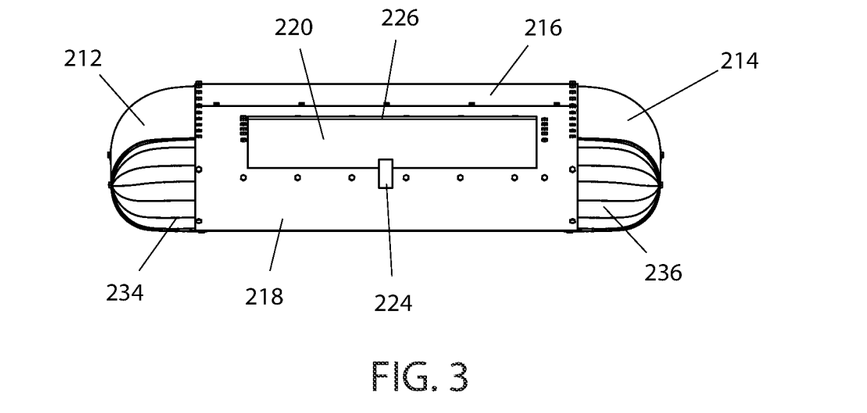
FIG. 3 is a rear elevation view of the aluminum structured travel cargo hold, according to the preferred embodiment of the present invention.
Figure 4:
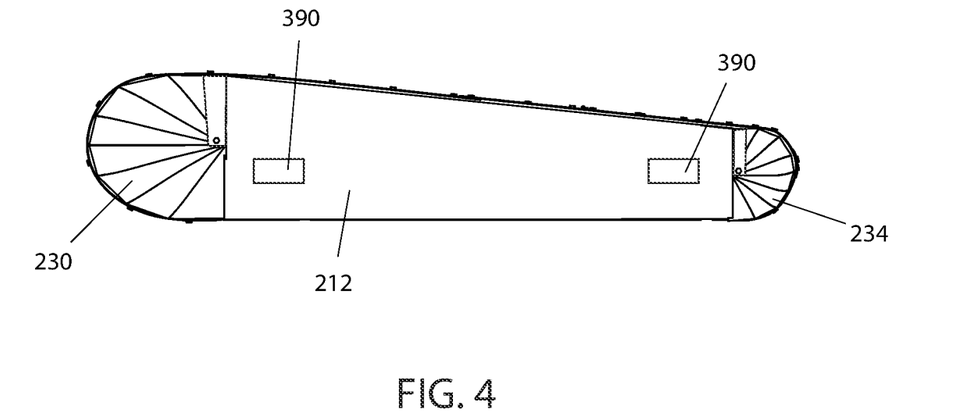
FIG. 4 is a right side elevation view of the aluminum structured travel cargo hold, according to the preferred embodiment of the present invention.
Figure 5:
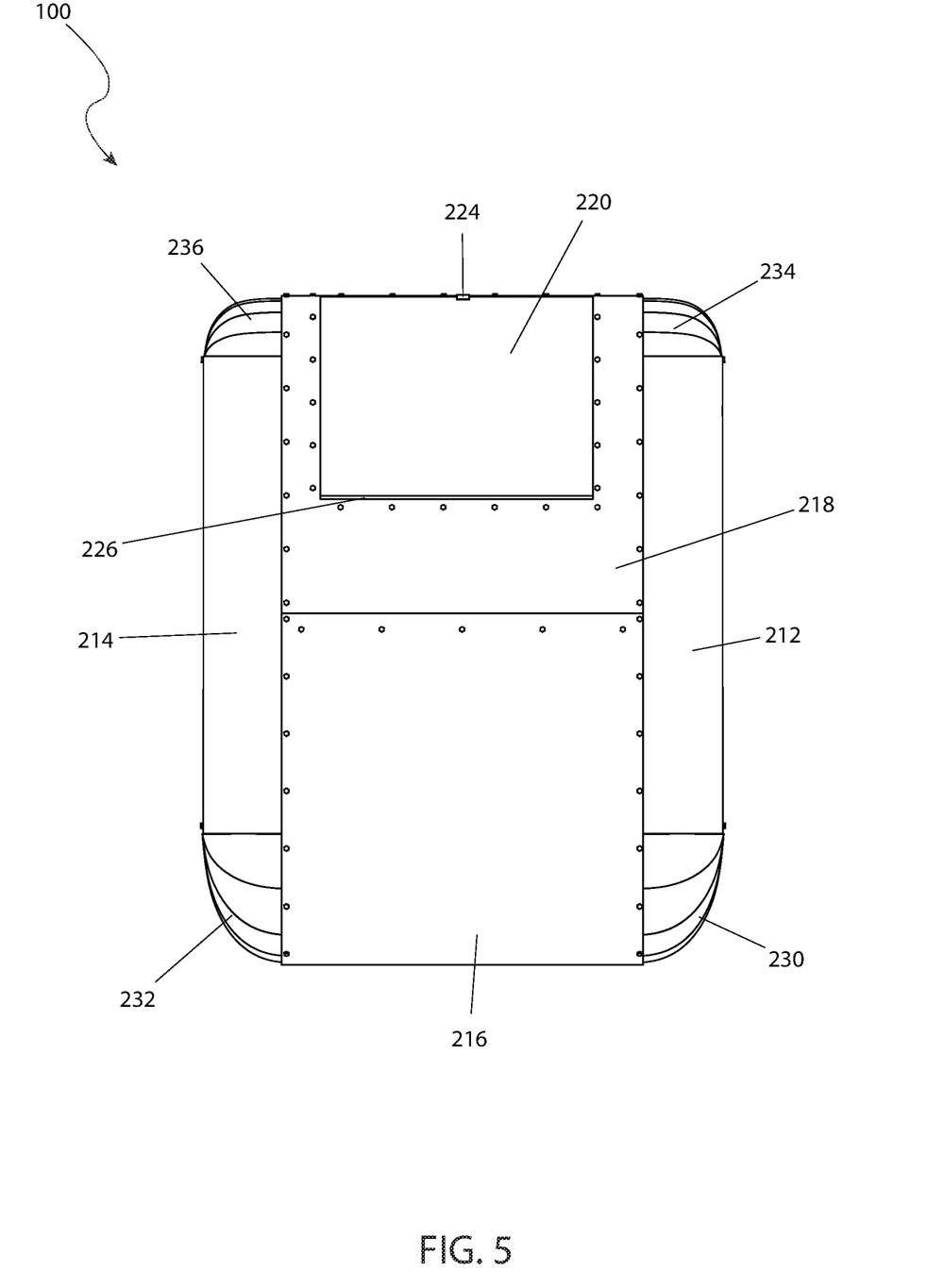
FIG. 5 is top plan view of the aluminum structured travel cargo hold, according to the preferred embodiment of the present invention.
Figure 6:
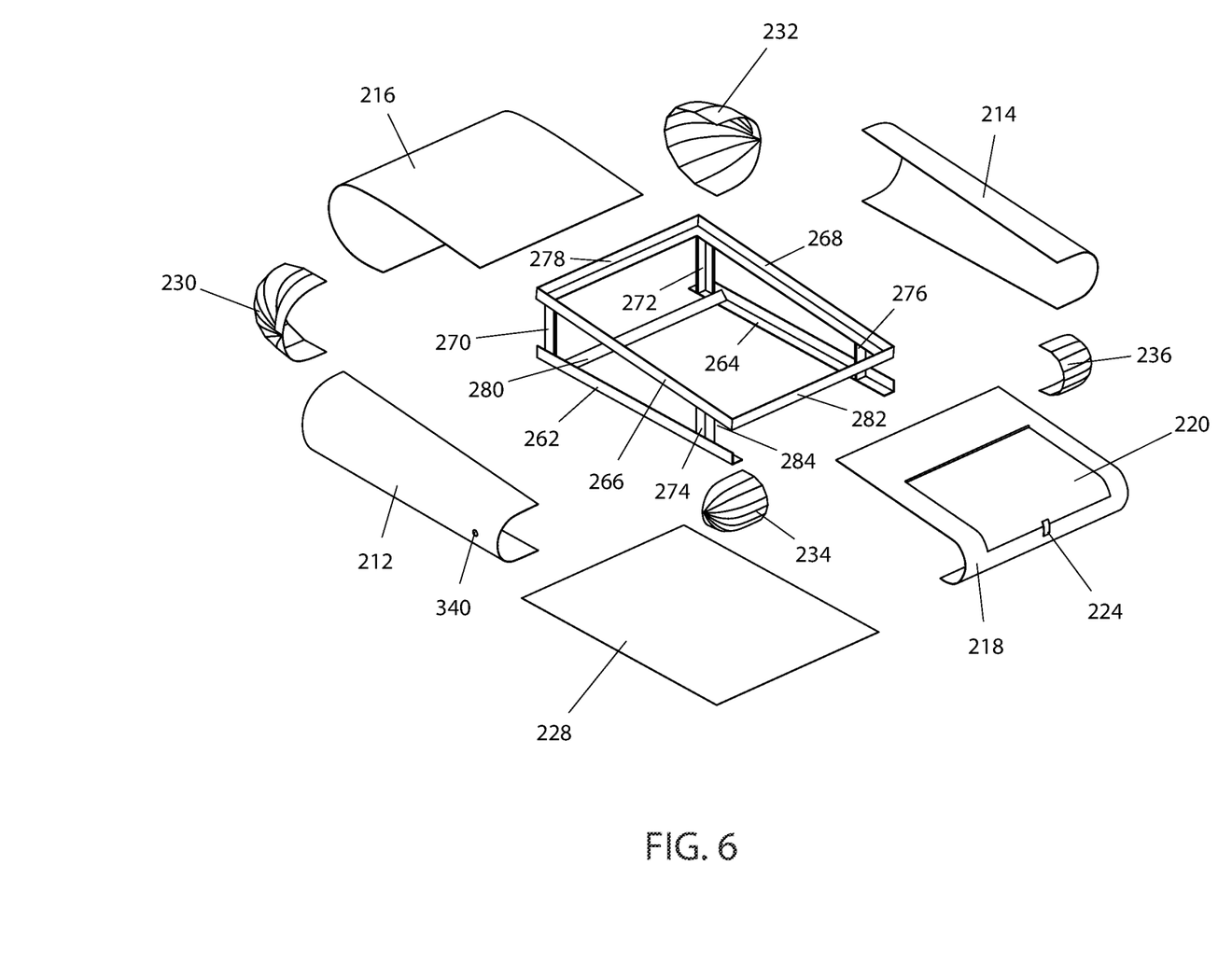
FIG. 6 is an exploded view of the aluminum structured travel cargo hold, according to the preferred embodiment of the present invention.
Figure 7:
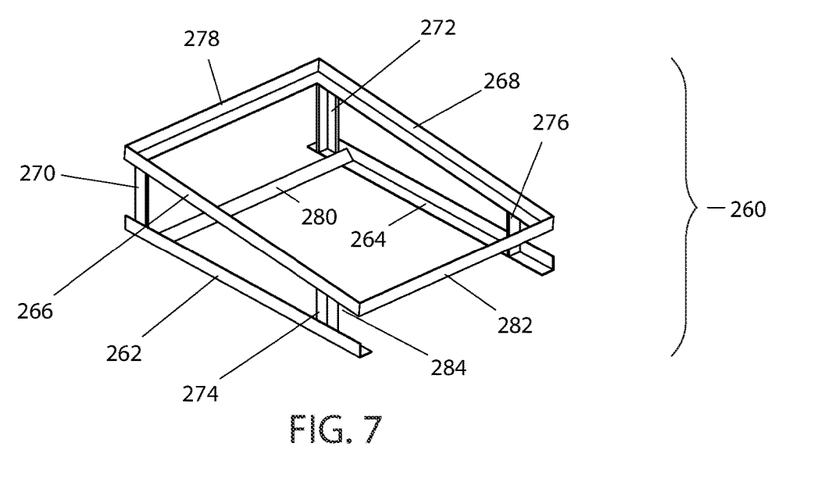
FIG. 7 is a top rear right perspective view of a support frame, according to the preferred embodiment of the present invention.

The support frame 260 may be a rigid structure located inside of the shell 210. The support frame 260 may comprise the left lower rail 262, the right lower rail 264, the left upper rail 266, the right upper rail 268, a left front upright 270, a right front upright 272, a left rear upright 274, a right rear upright 276, the top front cross brace 278, the bottom front cross brace 280, the top rear cross brace 282, and the bottom rear cross brace 284. The left lower rail 262 and the left upper rail 266 may support the left side of the rooftop carrier 200. The right lower rail 264 and the right upper rail 268 may support the right side of the rooftop carrier 200. As a non-limiting example, the support frame 260 may be made in part or in whole from angle iron.

The left front upright 270 may couple the front of the left lower rail 262 to the front of the left upper rail 266. The right front upright 272 may couple the front of the right lower rail 264 to the front of the right upper rail 268. The left front upright 270 and the right front upright 272 may determine the height of the front of the rooftop carrier 200.

The left rear upright 274 may couple the rear of the left lower rail 262 to the rear of the left upper rail 266. The right rear upright 276 may couple the rear of the right lower rail 264 to the rear of the right upper rail 268. The left rear upright 274 and the right rear upright 276 may determine the height of the rear of the rooftop carrier 200.

The top front cross brace 278, the bottom front cross brace 280, the top rear cross brace 282, and the bottom rear cross brace 284 may be coupled between the left side of the support frame 260 and the right side of the support frame 260. As non-limiting examples, the top front cross brace 278 and the top rear cross brace 282 may be coupled between corresponding ends of the left upper rail 266 and the right upper rail 268 and the bottom front cross brace 280 and the bottom rear cross brace 284 may be coupled between corresponding ends of the left lower rail 262 and the right lower rail 264. The top front cross brace 278, the bottom front cross brace 280, the top rear cross brace 282, and the bottom rear cross brace 284 may determine the width of the rooftop carrier 200.

Figure 11:
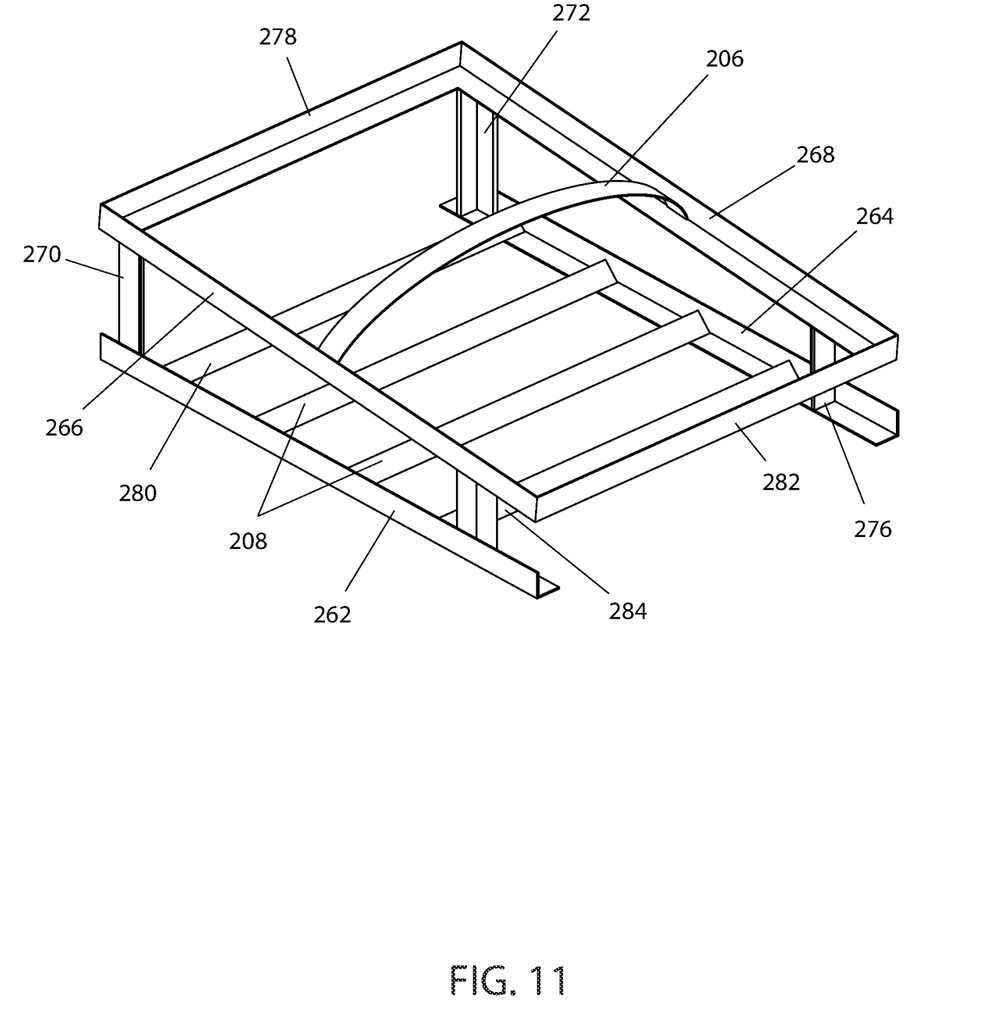
FIG. 11 is a detail view of the aluminum structured travel cargo hold illustrating the overhead arching cross member and the lateral intermediate cross members, according to the preferred embodiment of the present invention.

In some embodiments, the support frame 260 may further comprise an overhead arching cross member 206 and lateral intermediate cross members 208. The overhead arching cross member 206 may be an arched lateral support located between the left upper rail 266 and the right upper rail 268. The overhead arching cross member 206 may provide support to the top center of the shell 210 and may increase the storage space available within the rooftop carrier 200. The lateral intermediate cross members 208 may be lateral support elements coupled between the left lower rail 262 and the right lower rail 264. The lateral intermediate cross members 208 may provide support under the interior bottom panel 228.

As non-limiting examples, where panels, rails, corner covers, hinges, and latches couple with each other, the couplings may be screws, nuts and bolts, rivets, adhesives, welds, or combinations thereof.

In some embodiments, the shell 210 and the support frame 260 may be metal constructions. As a non-limiting example, the shell 210 may be constructed from aluminum and the support frame 260 may be constructed from steel.

In some embodiments, panels comprising the shell 210 may overlap each other. As a non-limiting example, the rear edge of the front panel 216 may overlap the front edge of the rear panel 218. Where panels overlap, the panels may be coupled together.

In some embodiments, the overall size of the rooftop carrier 200 may be customized prior to installation. As non-limiting examples, the width of the rooftop carrier 200, the length of the rooftop carrier 200, the height of the rooftop carrier 200, or combinations thereof may be reduced in order to fit the rooftop carrier 200 to a specific vehicle. As non-limiting examples, the size of the support frame 260 may be adjusted by providing individual rail members that are split into two (2) overlapping rails that slide past each other and are coupled in place at a desired length. Alternatively, rails may be cut to length and then reattached. The shell 210 may be resized by cutting and/or drilling individual panels according to directions prior to assembly.

The plurality of reflectors 390 may be dispersed over the rooftop carrier 200 to reflect light from the rooftop carrier 200. The plurality of reflectors 390 may increase visibility of the rooftop carrier 200 and the vehicle when traveling.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An aluminum structured travel cargo hold, comprising:
    a water tank having a water source and a tank aperture with a corresponding cap;
    a shower having a pump, a water filter, a shower hose, and a shower head, the shower is adapted to provide a plurality of water from the water source for showering, the pump includes an intake and an output, the shower is adapted to spray the water on a user for personal hygiene, the shower head is coupled to a distal end of the shower hose and a proximal end of the shower hose is coupled to an outlet of the water filter, and the water filter removes one or more impurities from the water as the water flows through the water filter;
    a rooftop carrier having a shell and a support frame, the rooftop carrier containing the water tank that is also mounted within the rooftop carrier, the support frame provides internal rigidity and a distinctive appearance for the rooftop carrier and the shell protect a plurality of contents of the rooftop carrier from weather;
    a plurality of reflectors dispersed over the rooftop carrier to reflect light from the rooftop carrier, the reflectors increasing visibility of the rooftop carrier while traveling; and
    a power switch energizing and de-energizing the pump.

2. The aluminum structured travel cargo hold, according to claim 1, wherein the water is removed from the water tank via an internal tubing that enters the water tank through the tank aperture.

3. The aluminum structured travel cargo hold, according to claim 2, wherein the internal tubing couples the output of the pump to the inlet of the water filter.

4. The aluminum structured travel cargo hold, according to claim 1, wherein the water tank has a capacity of 2 gals.

5. The aluminum structured travel cargo hold, according to claim 1, wherein the water enters the water filter at the inlet of the water filter and flows through the water filter to the outlet.

6. The aluminum structured travel cargo hold, according to claim 1, wherein the water tank, the pump, and the water filter is fluidly coupled to each other via the internal tubing.

7. The aluminum structured travel cargo hold, according to claim 1, wherein the pump draws the water from the water tank through the internal tubing into the intake of the pump and expels the water via the output of the pump.

8. The aluminum structured travel cargo hold, according to claim 1, wherein the pump moves the water by applying rotary motion, reciprocating motion, linear motion, or a combination thereof to one or more gears, one or more screws, one or more pistons, one or more shuttle blocks, one or more vanes, one or more diaphragms, one or more plungers, one or more chains, one or more ropes, one or more impellers, or any combinations thereof.

9. The aluminum structured travel cargo hold, according to claim 1, wherein the shower head is a plumbing fixture that converts a flow of pressurized water into a spray which exits the shower head via a plurality of apertures on the shower head.

10. The aluminum structured travel cargo hold, according to claim 1, wherein the shower hose is coiled and stored within the rooftop carrier when not in use.

11. The aluminum structured travel cargo hold, according to claim 1, wherein the shower hose and the shower head are pulled from the rooftop carrier via an access panel prior to use.

12. The aluminum structured travel cargo hold, according to claim 1, wherein the shower hose exits the rooftop carrier via an aperture disposed on the rooftop carrier.

13. The aluminum structured travel cargo hold, according to claim 1, wherein the rooftop carrier is coupled to a pair of rooftop cargo rails via a plurality of mounting hardware.

14. The aluminum structured travel cargo hold, according to claim 1, wherein the shell includes a left side panel, a right side panel, a front panel, a rear panel, the access panel, an interior bottom panel, a left front corner cover, a right front corner cover, a left rear corner cover, and a right rear corner cover.

15. The aluminum structured travel cargo hold, according to claim 14, wherein the corners of the shell are rounded and the rear of the shell is lower than the front of the shell.

16. The aluminum structured travel cargo hold, according to claim 1, wherein the power switch is mounted within the rooftop carrier and is supplied with an electrical potential from a vehicle's electrical system.

17. The aluminum structured travel cargo hold, according to claim 16, wherein the power switch passes the electrical potential to the pump when the power switch is in an ON state and the power switch blocks the electrical potential from reaching the pump when the power switch is in an OFF state.

18. The aluminum structured travel cargo hold, according to claim 16, wherein the pump is an electromechanical pump that includes an integral motor that is energized by an electrical potential to the pump.

19. The aluminum structured travel cargo hold, according to claim 1, wherein the shell is aerodynamically shaped to increase fuel efficiency of a vehicle carrying the rooftop carrier.

20. The aluminum structured travel cargo hold, according to claim 1, further comprising a remote control FOB that vary the power switch between the ON state and the OFF state by transmitting a wireless signal to the power switch.

* * * * *